Oct. 1, 1935.  D. M. SIMMONS  2,016,247
ELECTRICAL INSTALLATION
Filed May 30, 1930
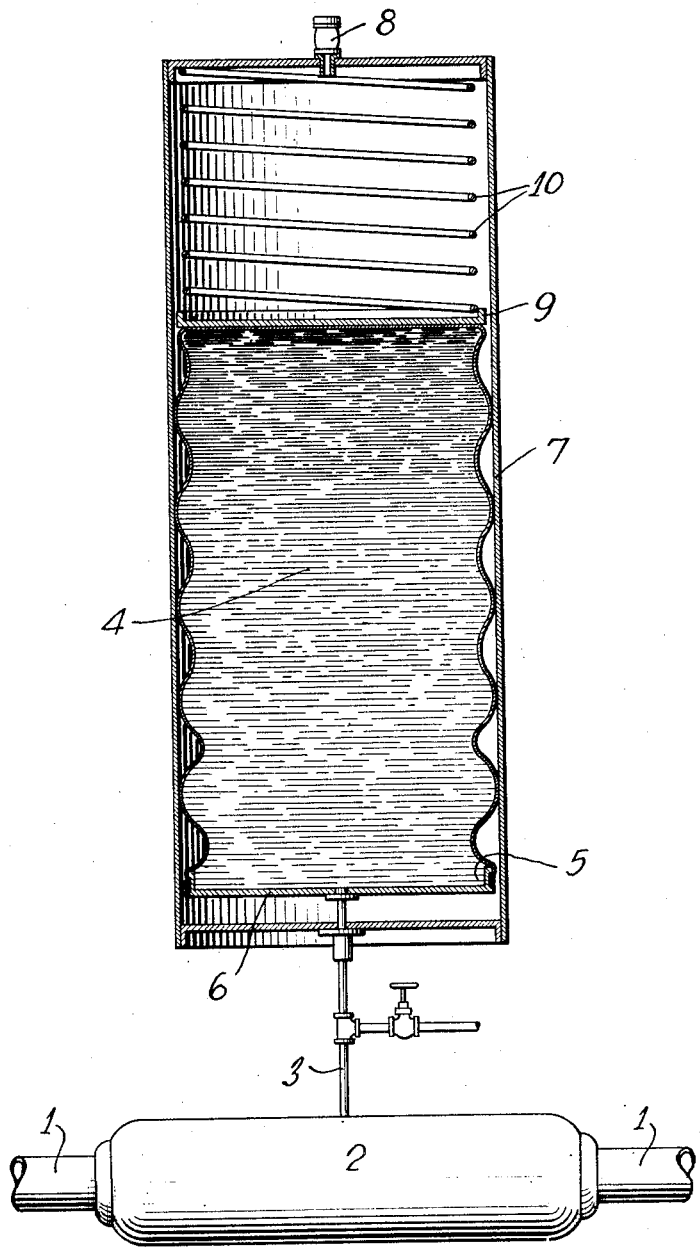
INVENTOR
Donald M. Simmons
BY
Emery, Booth, Varney & Whittemore
ATTORNEY Patented Oct. 1, 1935

2,016,247

UNITED STATES PATENT OFFICE 2,016,247

ELECTRICAL INSTALLATION

Donald M. Simmons, New York, N. Y., assignor to General Cable Corporation, New York, N. Y., a corporation of New Jersey Application May 30, 1930, Serial No. 457,594

7 Claims. (Cl. 137—71)

This invention relates to electrical installations and equipment, and more particularly to such installations and equipment which include insulation of a liquid character. It is an object of this invention to provide an improved arrangement for maintaining the integrity of the insulation. Other objects and advantages of the invention will appear hereinafter.

A preferred embodiment of the invention selected merely for purposes of illustration is shown in the accompanying drawing, in which:

The single figure shows a reservoir for liquid insulation connected, by way of example, with a cable joint.

In electrical installations and equipment which include within a confining wall a body of insulation of a liquid character it is desirable to provide means for maintaining at all times and under varying conditions the integrity of the insulation. Such means desirably will be effective to prevent the formation of voids or spaces in the insulation, and will provide for expansion and contraction of the insulation without permitting ingress of air and moisture. As used herein, the expression "liquid insulation" includes any insulation which in the course of service manifests characteristics of fluidity. Ordinarily, the liquid insulation will be an oil, and conveniently may be so described.

Referring to the drawing, two cable lengths 1 are united within a joint casing 2 which is connected fluid-tight at its ends to the sheaths of the cable lengths. The confined space within the joint casing 2 and surrounding the united cable ends ordinarily is filled with a liquid insulation which may be in continuity with the insulation in one or both of the cable lengths.

The joint casing 2 is connected by means of a pipe 3 with an external container 4 filled with a body of liquid insulation. The container 4 is provided with a flexible wall rendering the container expansible and collapsible so that it can compensate for variations in the volume of the liquid insulation within the joint casing and the cable lengths.

Preferably the container 4 is made from a thin non-metallic material which is light in weight and which has a high degree of flexibility. This flexible material should be impervious to the liquid insulation and to gas, and since one face of the material is in direct contact with the liquid insulation it should be formed from or include a material which does not affect and is not affected injuriously by the insulation.

The flexible material conveniently may take the form of a laminated structure including one or more layers of textile fabric such as cotton or silk, and one or more layers of material impervious to the liquid insulation. One form of a laminated structure suitable for use with insulating oils may comprise a layer of rubber, a layer of cotton, a layer of material impervious to and unaffected by the oil, for example cellulose acetate, and a second layer of cotton. In using such a material the face having the exposed layer of rubber should be maintained out of contact with the oil. Conveniently the layer of rubber may be integrally associated with the fibrous structure of the adjacent layer of cotton, and the two layers of cotton may be held together by the penetration of the intervening layer of cellulose acetate into the fibrous structure of the cotton.

The container 4 conveniently may take the form of an elongated cylindrical bag which is closed at one end and which has a connection at its other end to the pipe 3. The connection of the container 4 to the pipe 3 may be made in any suitable manner, as by binding the end of the bag down on the externally grooved flange 5 of a header plate 6 secured on the end of the pipe 3.

Desirably the flexible wall of the container 4 will respond accurately and quickly to variations in the volume of the insulation to maintain the integrity thereof by preventing the formation of voids and spaces. To insure such action, means are provided normally tending to compress the container 4 to apply pressure on the liquid insulation which will always be positive under changing conditions of service. Any suitable means may be employed for applying pressure to the insulation. In the particular embodiment disclosed pressure is applied to the insulation by means of a body of gas under pressure normally tending to collapse the container.

In order to protect the container 4 against injury, and for convenience in applying pressure to the contained body of liquid insulation, the container 4 preferably is enclosed within a tight walled chamber 7. Conveniently the chamber 7 may be of metal, and preferably it is provided with a closure 8 whereby gas may be forced into the chamber under pressure to exert any desired pressure on the liquid insulation. For economy in space the chamber 7 desirably is of such size that when the container 4 is expanded to its maximum volume the chamber is substantially filled by the container.

In the reservoir as thus far described, it will be apparent that the expansible and collapsible container of liquid insulation may be maintained under pressure tending to force the insulation into the electrical installation or equipment. In the event of a leak in the flexible wall separating the compartments containing the gas and the liquid insulation there would be a slow exchange of liquid and gas between the two compartments. It is desirable to prevent ingress of gas into the liquid body for the reason that the gas would work its way through the pipe 3 into the cable joint and cable lengths, thereby impairing the insulation.

According to this invention, means preferably are provided for creating a pressure differential between the bodies of liquid insulation and gas, so that the liquid insulation is maintained under a slightly greater pressure than the gas. With such an arrangement, a leak between the two compartments will result in a gradual flow of liquid insulation into the gas compartment, but without any flow of gas into the compartment containing the liquid insulation. For example, the means for creating the pressure differential between the bodies of liquid insulation and gas may take the form of a resiliently pressed plate 9 resting on the closed end of the elongated container 4. Pressure may be exerted on the plate 9 in any suitable manner, as by means of a spiral compression spring 10 located between the plate 9 and one end of the chamber 7.

It will be seen that an improved means is provided for protecting electrical installations which include in part a body of liquid insulation. A reservoir is provided which is light in weight, which may be manufactured readily and at a low cost, which is small in size and utilizes the space to the maximum advantage, and which effectively maintains the integrity of the liquid insulation under varying conditions.

While the invention has been illustrated and described with reference to certain embodiments, it will be understood that the invention is susceptible to various modifications and embodiments and is to be limited only by the claims.

I claim:

1. In combination with a length of sheathed cable, means for preserving the integrity of the cable insulation under changing conditions, such means including a flexible-walled container, a body of oil filling said container and in continuity with the interior of the cable length, a tight-walled chamber enclosing said container, a body of gas under pressure filling the space within said chamber surrounding said container, and spring means associated with said flexible-walled container for maintaining a pressure on the oil which is greater than the pressure on the gas to prevent passage of the gas into the oil in the event that a leak should develop in the flexible-walled container.

2. In combination with a length of sheathed cable, means for preserving the integrity of the cable insulation under changing conditions, such means including a flexible-walled container, a body of oil filling said container and in continuity with the interior of the cable length, a tight-walled chamber enclosing said container, a body of gas under pressure filling the space within said chamber surrounding said container, and means associated with said flexible-walled container for creating a pressure differential between the bodies of oil and gas to prevent passage of the gas into the oil in the event that a leak should develop in the flexible-walled container.

3. In combination with an electrical installation which includes a body of liquid insulation within a confining wall, means for preserving the integrity of such body of liquid insulation under changing conditions of service, such means including a tight-walled chamber having two compartments separated by a flexible wall impervious to the liquid insulation, a body of liquid insulation filling one of said compartments and in continuity with the body of liquid insulation within the confining wall of the installation, a body of gas under pressure filling the other compartment and exerting pressure on the flexible wall tending to force the liquid insulation from the chamber into said installation, and resilient means within said chamber and associated with said flexible wall for maintaining in the liquid-filled compartment a pressure greater than that in the gas-filled compartment to prevent passage of the gas into the body of liquid insulation in the event that a leak should develop in the flexible wall.

4. In combination with an electrical installation which includes a body of liquid insulation within a confining wall, means for preserving the integrity of such body of liquid insulation under changing conditions of service, such means including a tight-walled chamber having two compartments separated by a flexible wall impervious to the liquid insulation, a body of liquid insulation filling one of said compartments and in continuity with the body of liquid insulation within the confining wall of the installation, a body of gas under pressure filling the other compartment and exerting pressure on the flexible wall tending to force the liquid insulation from the chamber into said installation, and additional means associated with the flexible wall for creating a pressure differential between the two compartments to prevent passage of the gas into the body of liquid insulation in the event that a leak should develop in the flexible wall.

5. A variable capacity reservoir for supplying oil under pressure to an electrical installation comprising a readily collapsible container having an oil and gas-impervious flexible fabricated wall filled with oil and in communication with said installation, a tight-walled chamber of larger capacity than said container completely enclosing said container, and a body of gas under pressure within said chamber exteriorly of said oil container tending to collapse said oil-filled container to maintain a positive pressure on the oil within said electrical installation.

6. A variable capacity reservoir for supplying oil under pressure to an oil-filled electrical installation comprising a laminated fabric container filled with oil and in communication with said installation, a tight-walled chamber having approximately the same capacity as said fabric container, a body of gas under pressure within said chamber tending to collapse said oil-filled container to maintain a positive pressure on the oil within said electrical installation, and additional means normally tending to collapse said oil-filled container so that in case of a leak in the fabric the oil will flow out of the oil container into the gas chamber.

7. A variable capacity reservoir for supplying oil under pressure to an oil-filled electrical installation comprising a tight-walled chamber, a flexible-walled container within said chamber, means for supplying oil to said container, means for supplying gas under pressure to the chamber surrounding the container, and means in said chamber associated with said oil container and other than said gas under pressure normally tending to colla⋯ ⋅ the oil container.

DONALD M. SIMMONS.